United States Patent
Fukumura et al.

(10) Patent No.: US 9,500,239 B2
(45) Date of Patent: Nov. 22, 2016

(54) ELECTROMAGNETIC CLUTCH AND MANUFACTURING METHOD THEREOF

(71) Applicant: DENSO CORPORATION, Kariya, Aichi-pref. (JP)

(72) Inventors: Yoshinori Fukumura, Kariya (JP); Yasuo Tabuchi, Toyoake (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 14/761,734

(22) PCT Filed: Jan. 21, 2014

(86) PCT No.: PCT/JP2014/000264
§ 371 (c)(1),
(2) Date: Jul. 17, 2015

(87) PCT Pub. No.: WO2014/115532
PCT Pub. Date: Jul. 31, 2014

(65) Prior Publication Data
US 2015/0345573 A1 Dec. 3, 2015

(30) Foreign Application Priority Data
Jan. 23, 2013 (JP) .................................. 2013-010355

(51) Int. Cl.
*F16D 27/112* (2006.01)
*F16D 27/14* (2006.01)
*F16D 9/02* (2006.01)

(52) U.S. Cl.
CPC ............. *F16D 27/112* (2013.01); *F16D 27/14* (2013.01); *F16D 9/02* (2013.01); *F16D 2250/00* (2013.01); *F16D 2300/02* (2013.01)

(58) Field of Classification Search
CPC ............................ F16D 27/00–27/14; F16D 2250/00–2250/0092; F16D 2300/02; H01F 5/02; H01F 5/04; H01F 7/06
See application file for complete search history.

(56) References Cited

U.S. PATENT DOCUMENTS

| 5,687,823 A | 11/1997 | Nakagawa et al. |
| 5,941,357 A | 8/1999 | Tabuchi et al. |
| 5,984,069 A | 11/1999 | Takahashi |
| 2011/0048888 A1* | 3/2011 | Kurosu ................. F16D 27/112 192/84.1 |

FOREIGN PATENT DOCUMENTS

| JP | H08326782 A | 12/1996 |
| JP | H10089385 A | 4/1998 |

(Continued)

OTHER PUBLICATIONS

International Search Report and Written Opinion (in Japanese with English Translation) for PCT/JP2014/000264, mailed Mar. 25, 2014; ISA/JP.

*Primary Examiner* — Richard Lorence
(74) *Attorney, Agent, or Firm* — Harness, Dickey & Pierce, P.L.C.

(57) ABSTRACT

An end surface portion of a rotor includes a friction surface and an end surface, which are spaced from each other in an axial direction. The armature is attracted and attached to the friction surface of the rotor by an electromagnetic attractive force when a solenoid coil is energized. The stator is opposed to the end surface of the end surface portion. A thermal fuse is held by a portion of a resin member located in an opening of the stator and is melted and disconnected to cut supply of an electric current to the solenoid coil when a temperature of the thermal fuse is equal to or higher than a predetermined temperature. The resin member has a recess that is formed in a predetermined position of a surface of the resin member, which is adjacent to the thermal fuse.

13 Claims, 8 Drawing Sheets

(56) References Cited

FOREIGN PATENT DOCUMENTS

| JP | H11201190 A | 7/1999 |
| JP | 2000230579 A | 8/2000 |
| JP | 2006292010 A | 10/2006 |
| JP | 2014159873 A | 9/2014 |

* cited by examiner

ELECTROMAGNETIC CLUTCH AND MANUFACTURING METHOD THEREOF

CROSS REFERENCE TO RELATED APPLICATIONS

This application is a U.S. National Phase Application under 35 U.S.C. 371 of International Application No. PCT/JP2014/000264 filed on Jan. 21, 2014 and published in Japanese as WO 2014/115532 A1 on Jul. 31, 2014. This application is based on and claims the benefit of priority from Japanese Patent Application No. 2013-010355 filed on Jan. 23, 2013. The entire disclosures of all of the above applications are incorporated herein by reference.

TECHNICAL FIELD

The present disclosure relates to an electromagnetic clutch and a manufacturing method thereof.

BACKGROUND ART

An electromagnetic clutch having a thermal fuse is disclosed in Patent Literature 1. The thermal fuse is melted and disconnected by frictional heat generated between a friction surface of an armature and a friction surface of a rotor at the time of occurrence of locking of a compressor to cut supply of an electric current to an electromagnetic coil and thereby to place the electromagnetic clutch in a drive force blocked state.

In the electromagnetic clutch of Patent Literature 1, the thermal fuse is placed in an inside of a stator and is covered with a resin member that seals an opening of the stator. The thermal fuse is fixed in the inside of the stator by the resin member.

In the above prior art technique, similar to a comparative example discussed later, a surface of the resin member, which covers the thermal fuse, is a planar surface that is perpendicular to a rotational center axis of the rotor. Therefore, the resin member, which covers the thermal fuse, is thin in an axial direction of the rotational center axis of the rotor but is thick in an oblique direction, which is oblique to the rotational center axis. Therefore, radiant heat, which is incident to the resin member in the oblique direction being oblique to the rotational center axis and is directed to a center of the thermal fuse in the oblique direction, is not easily conducted to the thermal fuse. Because of the above described reason, the response of the thermal fuse is low in the above-described prior art technique.

CITATION LIST

Patent Literature

PATENT LITERATURE 1: JPH10-89385A (U.S. Pat. No. 5,941,357A)

SUMMARY OF INVENTION

The present disclosure addresses the above point, and it is an objective of the present disclosure to provide an electromagnetic clutch, which includes a thermal fuse having improved response and a manufacturing method of such an electromagnetic clutch. In order to achieve the objective, according to the present disclosure, there is provided an electromagnetic clutch that includes an electromagnetic coil, a rotor, an armature, a stator, a resin member, and a thermal fuse. The electromagnetic coil generates an electromagnetic attractive force when the electromagnetic coil is energized. The rotor is rotated about a rotational center axis when the rotor receives a rotational drive force from a drive source. The rotor includes a first surface and a second surface, which are spaced away from each other in an axial direction of the rotational center axis, and the first surface and the second surface extend in a direction perpendicular to the axial direction. The armature is connectable with a rotatable shaft of a driven-side device. The armature is attracted and attached to the first surface of the rotor by the electromagnetic attractive force when the electromagnetic coil is energized, and the armature is detached from the first surface of the rotor when the electromagnetic coil is not energized. The stator is opposed to the second surface of the rotor in the axial direction and forms a space between the stator and the second surface. The stator has an opening on a side wherein the second surface is located, and the stator receives the electromagnetic coil in an inside space of the stator, which is communicated with the opening. The resin member closes the opening of the stator and seals the electromagnetic coil in the inside space of the stator. The thermal fuse is held by a portion of a resin member located in an opening of the stator and is melted and disconnected to cut supply of an electric current to the solenoid coil when a temperature of the thermal fuse is equal to or higher than a predetermined temperature. The resin member has a recess that is formed in a predetermined position of a surface of the resin member, which is adjacent to the thermal fuse and is located on the side where the second surface is placed.

Furthermore, the present disclosure provides a manufacturing method of the electromagnetic clutch. According to this method, the electromagnetic coil and the thermal fuse configured into a cylindrical form are placed in the inside space of the stator. Next, a die is placed over the thermal fuse, and a recessed surface of the die is contacted to an outer peripheral surface of the thermal fuse. The recessed surface is recessed from a projection of the die to form an arcuately curved surface that has a radius of curvature, which is equal to or larger than a radius of curvature of the outer peripheral surface of the thermal fuse. A resin material in a molten state is filled into the inside space of the stator to mold the resin member having the recess formed by the projection of the die.

DESCRIPTION OF EMBODIMENTS

Various embodiments of the present disclosure will be described with reference to the accompanying drawings. In each of the following embodiments, the same or similar components are indicated by the same reference numerals.

First Embodiment

Figure 1:
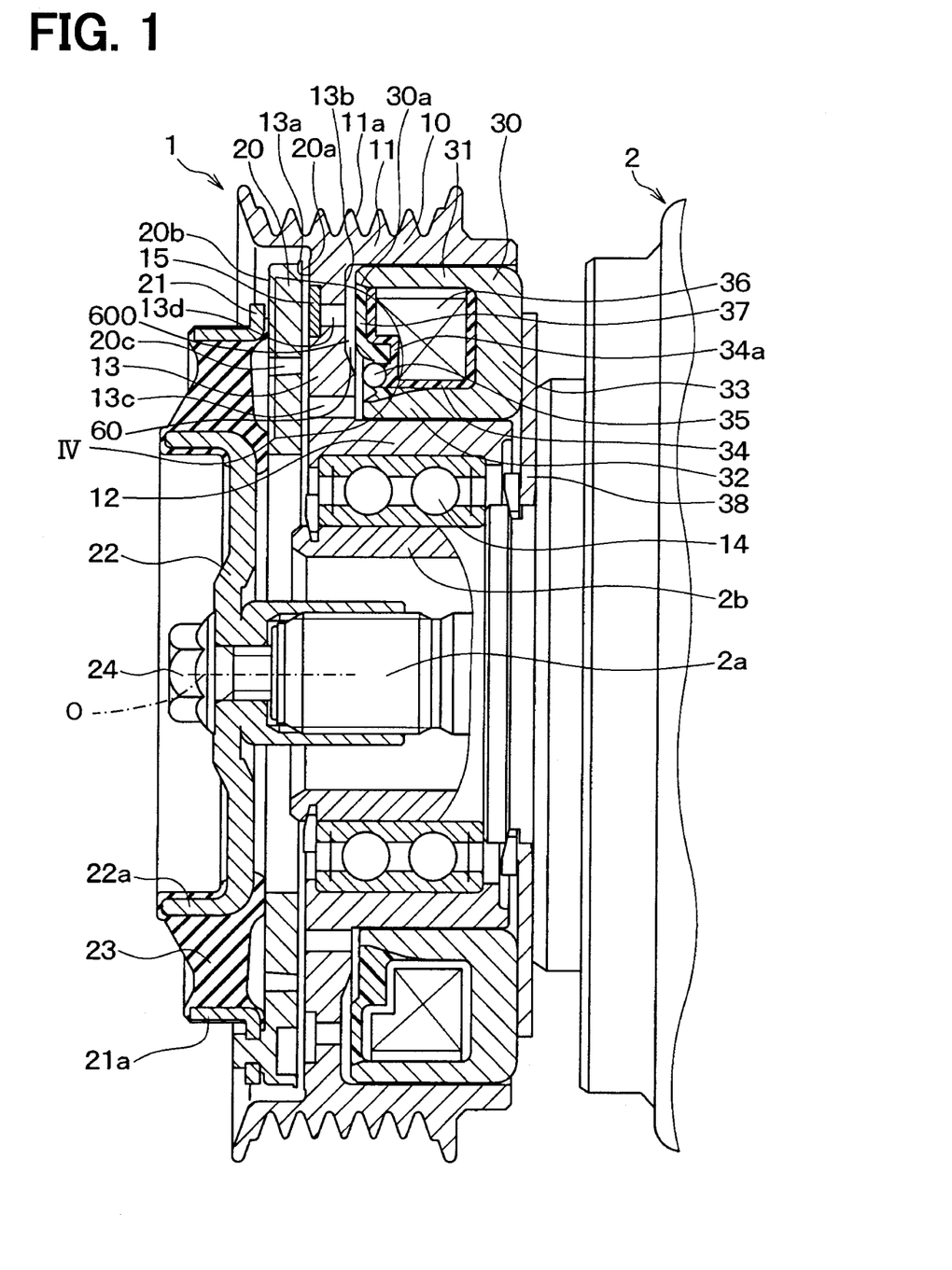
FIG. 1 is a cross-sectional view showing a structure of an electromagnetic clutch according to a first embodiment of the present disclosure.

An electromagnetic clutch 1 of a first embodiment of the present disclosure shown in FIG. 1 is implemented by applying a principle of the present disclosure to a clutch mechanism of a compressor 2. The compressor 2 receives a rotational drive force from an engine (serving as a drive source), which outputs a vehicle drive force, and thereby the compressor 2 rotates a compression mechanism thereof. Therefore, in the present embodiment, the engine is the drive source, and the compressor 2 is a driven-side apparatus.

The compressor 2 suctions and compresses refrigerant. The compressor 2 cooperates with a radiator, an expansion valve, and an evaporator to form a refrigeration cycle system of a vehicle air conditioning system. The radiator radiates heat from the refrigerant, which is discharged from the compressor 2. The expansion valve depressurizes and expands the refrigerant, which is outputted from the radiator. The evaporator evaporates the refrigerant, which is depressurized by the expansion valve, to implement heat absorption.

The electromagnetic clutch 1 includes a rotor 10 and an armature 20. The rotor 10 forms a driving-side rotatable body, which is rotated about a rotational center axis O thereof when the rotor 10 receives the rotational drive force from the engine. The armature 20 forms a driven-side rotatable body, which is connected to a rotatable shaft 2a of the compressor 2. When the rotor 10 and the armature 20 are coupled with each other, conduction of the rotational drive force from the engine to the compressor 2 is enabled. In contrast, when the rotor 10 and the armature 20 are decoupled from each other, the conduction of the rotational drive from the engine to the compressor 2 is disabled. FIG. 1 shows a state where the rotor 10 and the armature 20 are decoupled from each other.

That is, when the electromagnetic clutch 1 couples between the rotor 10 and the armature 20, the rotational drive force of the engine is conducted to the compressor 2 to drive the refrigeration cycle system. In contrast, when the electromagnetic clutch 1 decouples between the rotor 10 and the armature 20, the rotational drive force of the engine is not conducted to the compressor 2. Thereby, the refrigeration cycle system is not driven. The operation of the electromagnetic clutch 1 is controlled by a control signal, which is outputted from an air conditioning control apparatus that controls the operation of each of the constituent devices of the refrigeration cycle system.

Now, a specific structure of the electromagnetic clutch 1 will be described. As shown in FIG. 1, the electromagnetic clutch 1 includes the rotor 10, the armature 20 and the stator 30.

The rotor 10 is a double cylindrical tubular structure, which has an opening on a side that is spaced away from and is opposite from the armature 20, and a cross section of the double cylindrical tubular structure is configured to have a U-shape. Specifically, the rotor 10 includes an outer cylindrical tubular portion 11, an inner cylindrical tubular portion 12 and an end surface portion (a wall portion) 13. The inner cylindrical tubular portion 12 is placed on a radially inner side of the outer cylindrical tubular portion 11. The end surface portion 13 extends in a direction that is perpendicular to the rotational center axis O in such a manner that the end surface portion 13 connects between an end part of the outer cylindrical tubular portion 11 and an end part of the inner cylindrical tubular portion 12, which are located on a side where the armature 20 is located. The outer cylindrical tubular portion 11, the inner cylindrical tubular portion 12, and the end surface portion 13 are made of a magnetic material (e.g., an iron material).

The outer cylindrical tubular portion 11 and the inner cylindrical tubular portion 12 are arranged coaxially with the rotatable shaft 2a of the compressor 2. Specifically, the rotational center axis O of FIG. 1 serves as a rotational center axis of the outer cylindrical tubular portion 11 and of the inner cylindrical tubular portion 12 and also a rotational center axis of the rotatable shaft 2a. A V-groove 11a, around which a V-belt is wound, is formed in an outer peripheral part of the outer cylindrical tubular portion 11. An outer race of a ball bearing 14 is fixed to an inner peripheral part of the inner cylindrical tubular portion 12.

The ball bearing 14 rotatably supports the rotor 10 relative to a housing that forms an outer shell of the compressor 2. Therefore, an inner race of the ball bearing 14 is fixed to a housing boss 2b, which is formed in the housing of the compressor 2.

The end surface portion 13, which serves as the wall portion, includes one end surface (hereinafter referred to as a friction surface) 13a and the other end surface 13b, which are located on one side and the other side, respectively, in an axial direction of the rotational center axis O, and these end surfaces 13a, 13b are spaced from each other in the axial direction and extend in a direction that is perpendicular to the axial direction. In the end surface portion 13, magnetic shield slits 13c, 13d, each of which is configured into an arcuate form and which are arranged in two rows in a view taken in the axial direction, are formed by magnetic shield slit forming parts 13c1, 13d1, respectively. The magnetic shield slits 13c, 13d axially extend through the end surface portion 13 in the axial direction. In other words, the magnetic shield slits 13c, 13d extend between the one end surface, i.e., the friction surface 13a and the other end surface 13b of the end surface portion 13. The one end surface, i.e., the friction surface 13a of the end surface portion 13 is opposed to the armature 20 and is formed as a friction surface of the rotor 10, which contacts the armature 20 when the rotor 10 and the armature 20 are coupled with each other. The friction surface 13a and the end surface 13b of the end surface portion 13 serve a first surface and a second surface of the present disclosure.

In the present embodiment, a friction member 15, which increases a friction coefficient of the end surface portion 13, is placed in a portion of the friction surface 13a of the end surface portion 13. The friction member 15 is made of a non-magnetic material. Specifically, this non-magnetic material may be a material formed by mixing alumina into resin and solidifying the same. Alternatively, the non-magnetic material may be a sintered material of metal powder (e.g., aluminum powder).

The armature 20 is made of a magnetic material (e.g., iron material). The armature 20 is a circular disk member, which radially extends in the direction perpendicular to the rotational center axis O and has a through-hole that extends in the axial direction of the rotational center axis O through a center part of the circular disk member. A rotational center of the armature 20 is coaxial with the rotatable shaft 2a of the compressor 2. Specifically, the rotational center axis of the armature 20 coincides with the rotational center axis O.

Similar to the end surface portion 13 of the rotor 10, the armature 20 has a plurality of magnetic shield slits 20c, each of which is configured into an arcuate form in the view taken in the axial direction. The magnetic shield slits 20c extend through one end surface (hereinafter referred to as a friction surface) 20a and other end surface 20b of the armature 20. The magnetic shield slits 20c are radially placed between the magnetic shield slits 13c, which are located on the radially inner side in the end surface portion 13, and the magnetic shield slits 13d, which are located on at radially outer side in the end surface portion 13.

The one end surface, i.e., the friction surface 20a of the armature 20 is opposed to the friction surface 13a of the rotor 10 and is formed as a friction surface, which contacts the rotor 10 when the rotor 10 and the armature 20 are coupled with each other. An outer hub 21, which is configured into a generally circular disk form, is fixed to the other end surface 20b of the armature 20.

The outer hub 21 and an inner hub 22 described later form a connecting member, which connects between the armature 20 and the rotatable shaft 2a of the compressor 2. Each of the outer hub 21 and the inner hub 22 includes a cylindrical tubular portion 21a, 22a, which extends in the axial direction of the rotational center axis O. A cylindrical tubular rubber 23, which is a resilient member made of a resilient material (elastomer), is vulcanized and is secured to an inner peripheral surface of the cylindrical tubular portion 21a of the outer hub 21 and an outer peripheral surface of the cylindrical tubular portion 22a of the inner hub 22.

Furthermore, the inner hub 22 is fixed to the rotatable shaft 2a of the compressor 2 when a bolt 24, which is threadably fitted into a threaded screw hole of the rotatable shaft 2a, is tightened. Specifically, the inner hub 22 is configured to be coupleable with the rotatable shaft 2a of the compressor 2.

In this way, the armature 20, the outer hub 21, the rubber 23, the inner hub 22 and the rotatable shaft 2a of the compressor 2 are joined one after another. When the rotor 10 and the armature 20 are coupled with each other, the armature 20, the outer hub 21, the rubber 23, the inner hub 22, and the rotatable shaft 2a of the compressor 2 are rotated together with the rotor 10.

Furthermore, the rubber 23 exerts a resilient force relative to the outer hub 21 in a direction away from the rotor 10. In the decoupled state were the rotor 10 and the armature 20 are decoupled from each other, a predetermined gap is formed between the friction surface 13a of the rotor 10 and the friction surface 20a of the armature 20 that is joined to the outer hub 21.

The stator 30 is placed in an inside space 600 of the rotor 10, which is surrounded by the outer cylindrical tubular portion 11, the inner cylindrical tubular portion 12 and the end surface portion 13 of the rotor 10. Thereby, the stator 30 is opposed to the other end surface 13b of the end surface portion 13 and forms a space 60 between the stator 30 and the other end surface 13b of the end surface portion 13. When a thermal fuse 35, which is received in a receiving groove 340, is pushed by a press portion 51 of a die 50, the space 60 enables movement of the thermal fuse 35 toward a bottom portion 340c of the receiving groove 340. The stator 30 is made of a magnetic material (e.g., an iron material) and receives an electromagnetic coil 36 in an inside of the stator 30.

The stator 30 is a double cylindrical tubular structure, which has an opening 30a on an end surface 13b side (a friction surface 13a side), and a cross section of the double cylindrical tubular structure is configured to have a U-shape. Specifically, the stator 30 includes an outer cylindrical tubular portion 31, an inner cylindrical tubular portion 32 and an end surface portion 33. The inner cylindrical tubular portion 32 is placed on a radially inner side of the outer cylindrical tubular portion 31. The end surface portion 33 extends in the direction that is perpendicular to the rotational center axis O in such a manner that the end surface portion 33 connects between an end part of the outer cylindrical tubular portion 31 and an end part of the inner cylindrical tubular portion 32, which are located on the side that is spaced away from and is opposite from the friction surface 13a of the rotor 10.

A coil spool 34, which is configured into an annular form, and the thermal fuse 35 are received in an inside space 300 of the stator 30, which is communicated with the opening 30a of the stator 30. The coil spool 34 is made of a resin material (e.g., polyamide resin). The electromagnetic coil 36 is wound around the coil spool 34.

The thermal fuse 35 is placed at the opening 30a side of the stator 30. In the present embodiment, the thermal fuse 35 is placed in a recess that is formed in an inner peripheral corner of the coil spool 34. The recess is formed by a stepped configuration of a side wall portion 34a of the coil spool 34, which is located on the armature 20 side.

Figure 2:
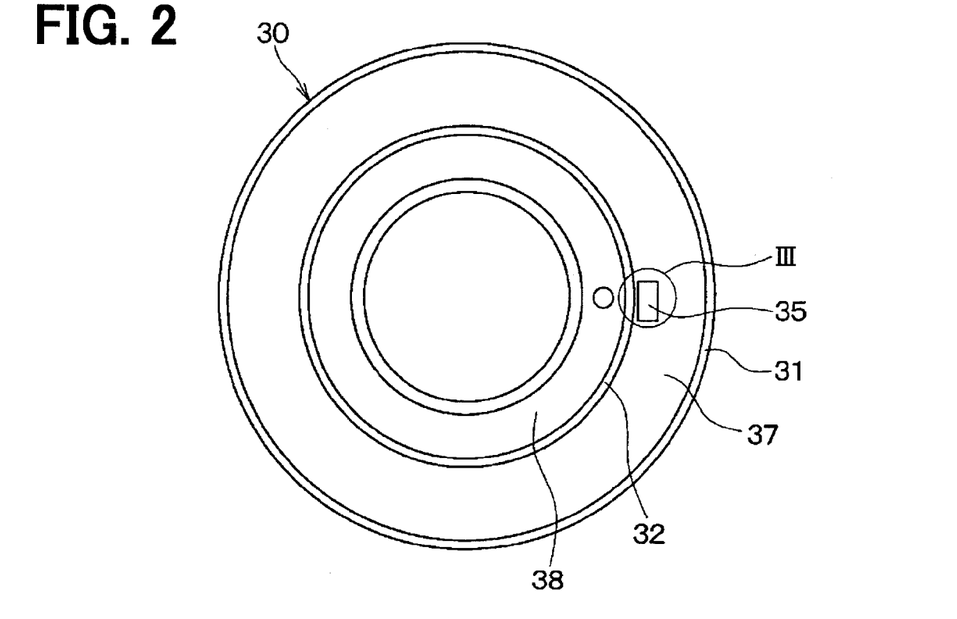
FIG. 2 is a front view of a stator of FIG. 1 taken from an armature side.

Furthermore, a resin member 37, which seals the electromagnetic coil 36, is placed at the opening 30a side of the stator 30. In this way, as shown in FIG. 2, the opening 30a of the stator 30 is closed by the resin member 37. Furthermore, as shown in FIG. 1, the thermal fuse 35 is held by the resin member 37 located at the opening 30a. The resin member 37 is made of, for example, polyamide resin and has a black color.

Furthermore, a stator plate 38 is fixed to the outer side (the right side in FIG. 1) of the end surface portion 33 of the stator 30. The stator 30 is fixed to the housing of the compressor 2 through the stator plate 38.

Figure 3:
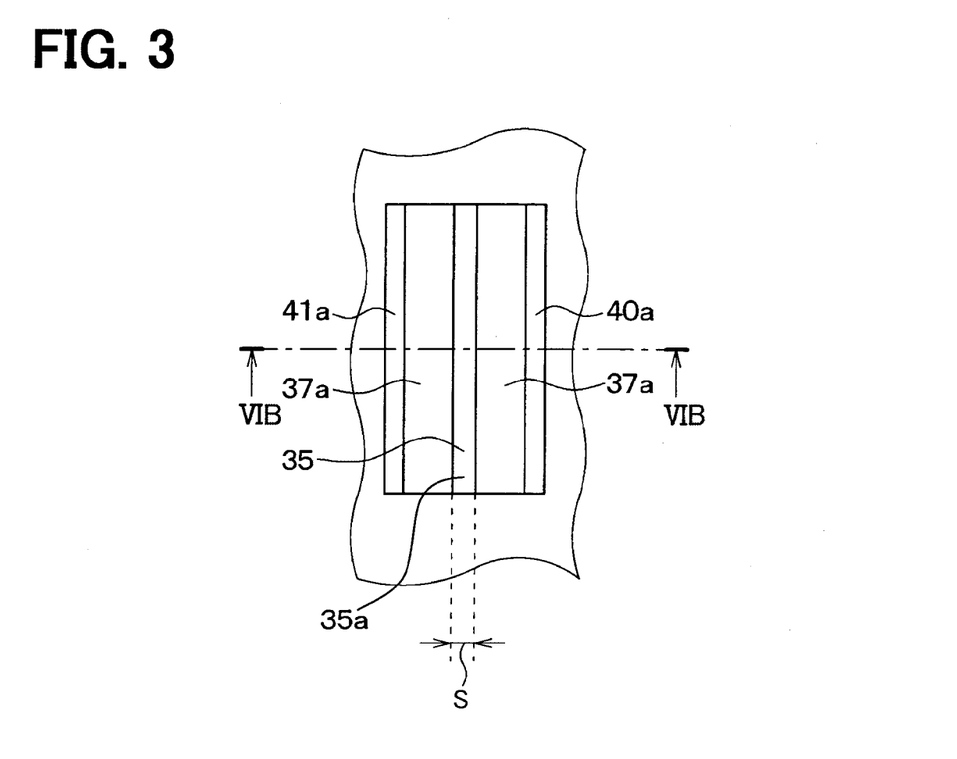
FIG. 3 is a partial enlarged view of an area III in FIG. 2.

Next, a fixing structure of the thermal fuse 35 at the stator 30 will be described in detail. The thermal fuse 35 is a fuse that is melted and disconnected by frictional heat generated through slide between the friction surface 20a of the armature 20 and the friction surface 13a of the rotor 10 at the time of occurrence of locking of the rotatable shaft 2a of the compressor 2 to cut supply of an electric current to the electromagnetic coil 36. Therefore, as shown in FIGS. 3 and 4, the resin member 37 has a structure that facilitates conduction of radiant heat from a high temperature portion of the rotor 10 to the thermal fuse 35.

The thermal fuse 35 has an outer shape configured into a cylindrical form and includes a case 351, which is configured into a cylindrical tubular form, and a fusible material 352, which is received in an inside of the case 351. In the present embodiment, the case 351 is made of ceramic, and the fusible material 352 is a low-melting-point alloy. The case 351 itself has a white color.

Figure 4:
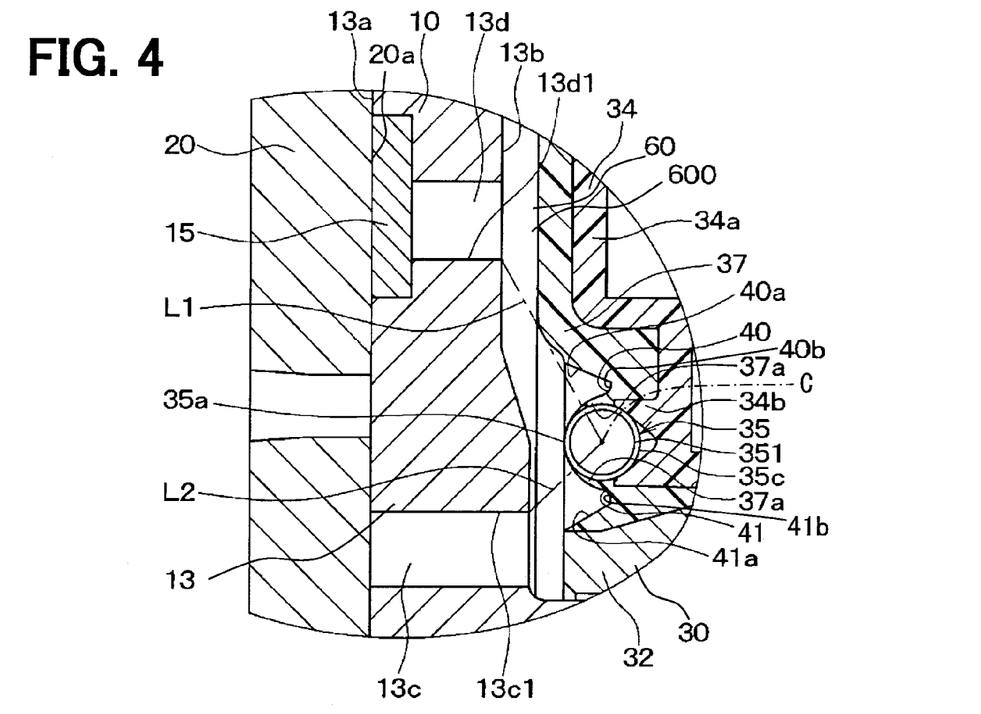
FIG. 4 is a partial enlarged view of an area IV in FIG. 1.
Figure 5:
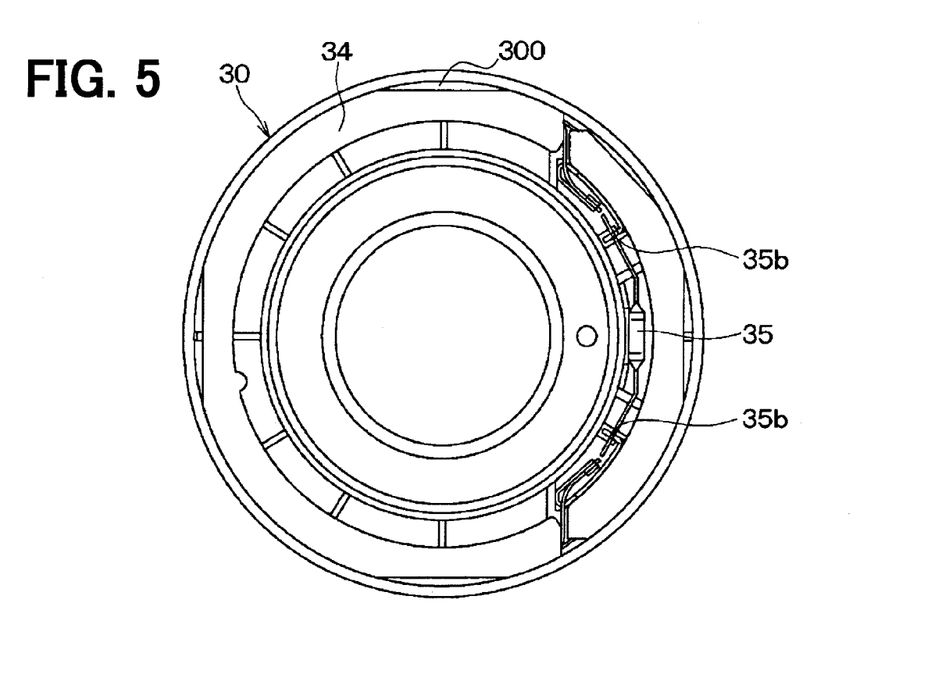
FIG. 5 is a front view of the stator of the first embodiment in a state before sealing of the stator with a resin member.

As shown in FIG. 5, which will be described later, the thermal fuse 35 is placed such that an axial direction (a longitudinal direction) of the thermal fuse 35, which is configured into the cylindrical form, is along a circumferential direction of the stator 30. At this time, as indicated in FIG. 4 and FIG. 6(b), which will be described later, when a cross section of the case 351 of the thermal fuse 35, which is taken in a direction perpendicular to the circumferential direction of the stator 30, is viewed, the cross section of the case 351 of the thermal fuse 35 has a circular shape. Although the case 351 itself has the white color, a coating film 35c, which has a black color, is formed in a surface (an outer peripheral surface) 351a of the case 351. The coating film 35c is made of, for example, silicone resin.

As shown in FIG. 4, a mount 34b is formed in the inner peripheral corner of the coil spool 34. The mount 34b serves as a support portion and forms an installation location of the thermal fuse 35. The mount has a cross section that is configured into a V-shape. The thermal fuse 35 is installed on the mount 34b.

The resin member 37 covers the thermal fuse 35, which is mounted on the mount 34b. A recess 40 and a recess 41 are formed in the surface of the resin member 37, which is located on the side where the other end surface 13b of the rotor 10 is placed (i.e., the side where the friction surface 13a is placed), at two adjacent locations, respectively, that are adjacent to the thermal fuse 35 and are located at two opposite sides of the thermal fuse 35 in the radial direction of the stator 30 (a predetermined location on one side of the thermal fuse 35 and a predetermined location on the other side of the thermal fuse 35). Here, it should be noted that a top-to-bottom direction of FIG. 4 is the radial direction of the stator 30. A bottom portion 40b of the recess 40 and a bottom portion of the recess 41 are placed at a location that is the same as a location of a center C of the cross section of the thermal fuse 35 or on a side of the center C of the cross section of the thermal fuse 35, which is spaced from the friction surface 13a and is opposite from the friction surface 13a, in the axial direction of the rotational center axis O. In other words, in an imaginary plane that extends in a direction perpendicular to the axial direction of the thermal fuse 35, the recess 40 and the recess 41 are recessed at least to a depth that corresponds to the location of the center C of the cross section of the thermal fuse 35.

Furthermore, in the imaginary plane, which extends in the direction perpendicular to the axial direction of the thermal fuse 35, each of imaginary lines L1, L2 connects by a shortest distance between the corresponding magnetic shield slit 13c, 13d of the rotor 10 (more specifically, an inner peripheral edge of the opening of the magnetic shield slit 13c, 13d located on the side where the stator 30 is placed) and the center C of the cross section of the thermal fuse 35, and an outer edge part 40a, 41a of each of the recesses 40, 41 is located on a side of the corresponding imaginary line L1, L2, which is opposite from the end surface 13b (i.e., a side that is opposite from the friction surface 13a). The outer edge part 40a, 41a of the recess 40, 41 refers to a part of the recess 40, 41, which is located at a side that is apparat from the thermal fuse 35. Therefore, the resin member 37 is absent on the imaginary line L1, L2 or is thinned on the imaginary line L1, L2.

Specifically, in the imaginary plane, which extends in the direction perpendicular to the axial direction of the thermal fuse 35, the imaginary line L1 connects by the shortest distance between the magnetic shield slit 13d, which is located on the outer side of the thermal fuse 35 in the radial direction of the stator 30, and the center C of the cross section of the thermal fuse 35, and the outer edge part 40a of the recess 40, which is located on the outer side of the thermal fuse 35 in the radial direction of the stator 30, is located on the side of the imaginary line L1, which is opposite from the end surface 13b (i.e., the side that is opposite from the friction surface 13a).

Similarly, in the imaginary plane, which extends in the direction perpendicular to the axial direction of the thermal fuse 35, the imaginary line L2 connects by the shortest distance between the magnetic shield slit 13c, which is located on the inner side of the thermal fuse 35 in the radial direction of the stator 30, and the center C of the cross section of the thermal fuse 35, and the outer edge part 41a of the recess 41, which is located on the inner side of the thermal fuse 35 in the radial direction of the stator 30, is located on the side of the imaginary line L2, which is opposite from the end surface 13b (i.e., the side that is opposite from the friction surface 13a).

The outer edge part 40a, 41a of each of the recesses 40, 41 is not parallel to the rotational center axis O of the rotatable shaft 2a of the compressor 2 and is configured to be tapered in a direction away from the friction surface 13a of the rotor 10, so that the outer edge part 40a, 41a progressively approaches the thermal fuse 35 in the direction away from the friction surface 13a.

The thermal fuse 35 is covered with a thin film portion 37a of the resin member 37, which is located between the recess 40, 41 and the thermal fuse 35. In the present embodiment, a thickness of the thin film portion 37a is generally equal at an axial center part of the thermal fuse 35 and axial end parts of the thermal fuse 35. That is, the thickness of the thin film portion 37a is generally equal along the entire length of the thermal fuse 35. Furthermore, in the present embodiment, a portion of an outer peripheral surface 350 of the thermal fuse 35, which is located at the armature 20 side (i.e., the side where the end surface 13b is placed), is exposed from the resin member 37 to form an exposed portion 35a.

The resin member 37, which has the above-described structure, is formed as follows.

First of all, as shown in FIG. 5, the coil spool 34, around which the electromagnetic coil 36 is wound, and the thermal fuse 35 are placed in the inside space 300 of the stator 30. At this time, the thermal fuse 35 is mounted on the mount 34b of the coil spool 34 shown in FIGS. 6(b) and 6(c). Specifically, the thermal fuse 35 is received in the receiving groove 340, which is formed between a first support arm 34b1 and a second support arm 34b2 of the mount 34b, so that the thermal fuse 35 is supported by a first support surface 340a of the first support arm 34b1 and a second support surface 340b of the second support arm 34b2. At this time, at least one half of a circumferential range of the outer peripheral surface 350 of the thermal fuse 35 (at least an angular range of 180 degrees along the outer peripheral surface 350 in the circumferential direction) is exposed from the receiving groove 340. Terminal portions 35b of the thermal fuse 35 are electrically connected to the electromagnetic coil 36.

Figure 6:
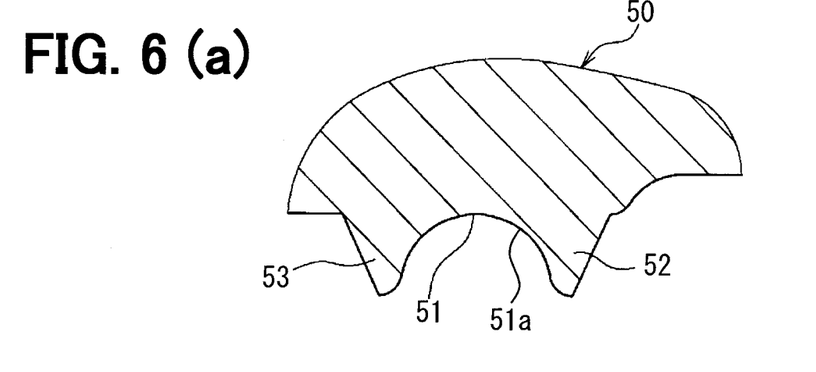
FIG. 6(a) is a cross-sectional view of a die used in resin molding of the resin member of the first embodiment.
FIG. 6(b) is a cross-sectional view taken along line VIB-VIB in FIG. 3.
FIG. 6(c) is a partial cross-sectional view of a mount of a coil spool of FIG. 6(b).

Next, the die 50 shown in FIG. 6(*a*) is placed on the thermal fuse 35. Then, in a state where the die 50 presses the thermal fuse 35, a resin molding process, which forms the resin member 37 in the inside of the stator 30, is performed, so that the resin member 37, which has the structure shown in FIG. 6(*b*), is obtained.

The die 50, which is used at this time, is configured such that the press portion 51, which presses the thermal fuse 35, has two projections 52, 53, which are configured to correspond with the two recesses 40, 41, respectively, of the resin member 37. The projections 52, 53 form an arcuate cross section, which is opposed to the thermal fuse 35 and has a radius of curvature that is larger than a radius of curvature of the outer peripheral surface 350 of the thermal fuse 35. Specifically, the press portion 51 has a recessed surface 51*a*, which contacts the outer peripheral surface 350 of the thermal fuse 35. The recessed surface 51*a* is located between the two projections 52, 53 and is recessed from the projections 52, 53 to form an arcuately curved surface that has the radius of curvature, which is equal to or larger than the radius of curvature of the outer peripheral surface 350 of the thermal fuse 35.

In the present embodiment, the receiving groove 340 of the mount 34*b*, which receives the portion of the outer peripheral surface 350 of the thermal fuse 35 located on the side where the electromagnetic coil 36 is placed, has the cross section that is configured into a V-shape and is tapered in a direction away from the thermal fuse 35, as shown in FIGS. 6(*b*) and 6(*c*). A space 360 is formed between the thermal fuse 35, which is supported by the first support surface 340*a* and the second support surface 340*b*, and the bottom portion 340*c* of the receiving groove 340. The shape of the cross section of the receiving groove 340 is not limited to the V-shape and may be changed to any other shape as long as the cross section of the receiving groove 340 is tapered in the direction away from the thermal fuse 35. When the die 50 presses the thermal fuse 35, the receiving groove 340, which is configured into the V-shape, positions the thermal fuse 35 in the top-to-bottom direction and the left-to-right direction in FIG. 6(*b*). Furthermore, due to the V-shape of the receiving groove 340 of the mount 34*b*, when the die 50 presses the thermal fuse 35, the first support arm 34*b*1 and the second support arm 34*b*2 of the mount 34*b* are resiliently deformed and flexed toward the left side and the right side, respectively, in FIGS. 6(*b*) and 6(*c*). Therefore, it is possible to limit squashing of the thermal fuse 35 by the die 50.

Furthermore, in the present embodiment, the recessed surface 51*a* of the press portion 51, which has the radius of curvature that is larger than the radius of curvature of the thermal fuse 35, presses the thermal fuse 35. Therefore, the positioning between the die 50 and the thermal fuse 35 can be eased. Furthermore, in comparison to a case where a press portion, which has a planar surface, presses the thermal fuse 35, when the recessed surface 51*a* of the press portion 51 presses the thermal fuse 35, a contact surface area between the recessed surface 51*a* of the press portion 51 and the resin member is increased. Therefore, molding heat can be released from the thermal fuse 35 and the resin member 37 through the press portion 51.

After the recessed surface 51*a* of the press portion 51 is placed into contact with the outer peripheral surface 350 of the thermal fuse 35, the resin material (e.g., polyamide resin), which is in a molten state, is filled into the inside space 300 of the stator 30, so that there is molded the resin member 37, which has the recesses 40, 41 formed by the projections 52, 53 of the die 50. After the completion of the molding process, the die 50 is released from the resin member 37. In this way, there is formed the exposed portion 35*a*, which is the portion of the thermal fuse 35 that is located on the armature 20 side and is exposed from the resin member 37. The exposed portion 35*a* is exposed from the resin member 37 through a circumferential extent S of the outer peripheral surface of the thermal fuse 35 indicated in FIG. 6(*b*).

Next, the operation of the electromagnetic clutch 1, which is constructed in the above-described manner, will be described. When the electromagnetic coil 36 is energized, the armature 20 is magnetically attracted to the friction surface 13*a* of the rotor 10 by the electromagnetic attractive force generated from the electromagnetic coil 36, so that the rotor 10 and the armature 20 are coupled with each other. Thereby, the rotational drive force is conducted from the engine to the compressor 2.

In contrast, when the energization of the electromagnetic coil 36 is stopped, i.e., when the electromagnetic coil 36 is deenergized, the armature 20 is separated from the friction surface 13*a* of the rotor 10 by the resilient force of the rubber 23. Thereby, the rotational drive force is not conducted from the engine to the compressor 2.

Next, advantages of the present embodiment will be described. In a comparative example shown in FIG. 7, the recesses 40, 41 are not formed in the surface of the resin member 37, which covers the thermal fuse 35, unlike the present embodiment. In this comparative example, at the location adjacent to the thermal fuse 35, the surface of the resin member 37 is planar in the direction perpendicular to the rotational center axis O (see FIG. 1). The rest of the structure of the comparative example is the same as that of the present embodiment.

Figure 7:
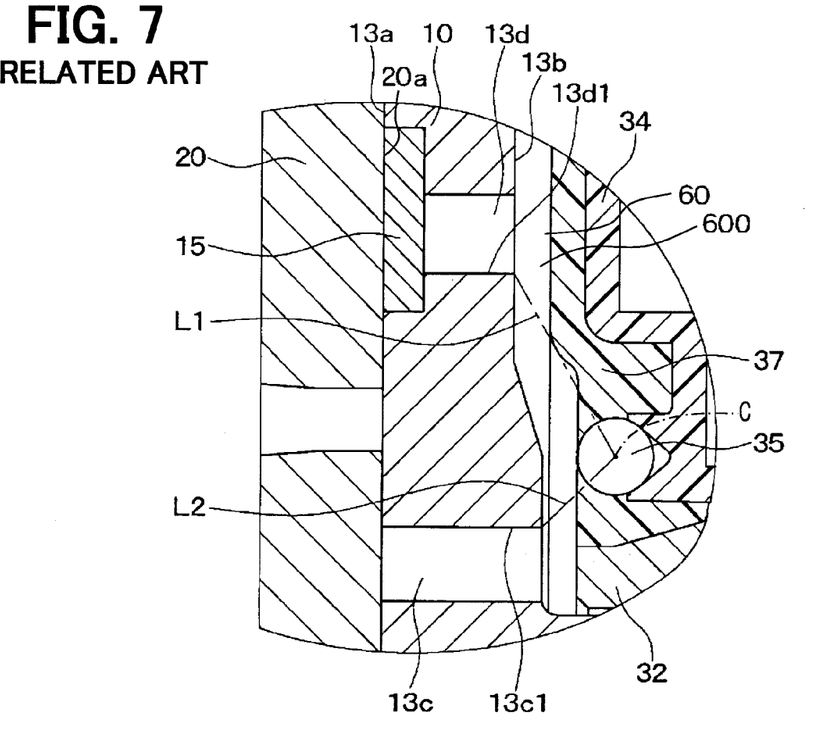
FIG. 7 is a partial cross-sectional view of an electromagnetic clutch of a comparative example.

Therefore, the resin member 37, which covers the thermal fuse 35, is absent or is thinned along a line, which extends through the center C of the cross section of the thermal fuse 35 and is parallel to the rotational center axis O. However, the resin member 37 is thickened along a line, which extends through the center C of the cross section of the thermal fuse 35 and is tilted relative to the rotational center axis O. For example, in the imaginary plane, which extends in the direction that is perpendicular to the axial direction of the thermal fuse 35, the resin member 37 is thickened along each of the imaginary lines L1, L2, each of which connects by the shortest distance between the corresponding magnetic shield slit 13*c*, 13*d* and the center C of the cross section of the thermal fuse 35.

Here, at the time of locking the rotatable shaft 2*a* of the compressor 2, when the thermal fuse 35 absorbs the radiant heat, which is generated at the friction surface 13*a* of the rotor 10 at the time of occurrence of locking of the rotatable shaft 2*a* of the compressor 2, and is thereby heated to a temperature equal to or higher than the predetermined temperature, the thermal fuse 35 is melted and disconnected. The radiant heat is a type of electromagnetic wave and is transmitted through the air or a material. The radiant heat can be easily transmitted through the air. However, the radiant heat cannot be easily transmitted through a material that has a high reflectivity, a high absorbability, and a low permeability. Furthermore, when a value of absorption spectrum in a wavelength range of the radiant heat, which is 0.1 µm to 0.1 mm, is higher, the absorbability of the material is higher. For example, when the color of the material is darkened toward the black color, the value of absorption spectrum of the material is increased, and thereby the radiant heat absorbability of the material is increased. In contrast, when the color of the material is close to the white color, the reflectivity for reflecting the radiant heat is increased. The resin member 37 of the comparative example shown in FIG. 7 has the black color, so that the resin member 37 has the high absorbability for absorbing the radiant heat. However, since the resin member 37 is thick, the heat conduction from the surface of the resin member 37 to the thermal fuse 35 is delayed.

Therefore, although the radiant heat, which is directed to the center C of the cross section of the thermal fuse 35 in the axial direction of the rotational center axis O, can be easily conducted to the thermal fuse 35, the radiant heat, which is directed to the center C of the cross section of the thermal fuse 35 in an oblique direction, which is oblique to the rotational center axis O, cannot be easily conducted to the thermal fuse 35 due to the presence of the thick resin member 37. Therefore, in the comparative example shown in FIG. 7, an incident angle of the radiant heat, which can quickly reach the thermal fuse 35, is small. The incident angle is an angle that is defined between the axial direction of the rotational center axis O and an incident direction of the radiant heat.

In contrast, according to the present embodiment, the recesses 40, 41 are formed in the surface of the resin member 37, so that a space is provided at the location adjacent to the thermal fuse 35, and thereby a conduction path, along which the radiant heat can be easily conducted, is provided. Furthermore, the thickness of the resin member 37, which covers the thermal fuse 35, is thinned in comparison to the comparative example shown in FIG. 7. Here, the thickness of the resin member 37 refers to a thickness of the thin film portion 37a along the oblique line, which extends through the center C of the cross section of the thermal fuse 35 and is oblique to the rotational center axis O.

Therefore, according to the present embodiment, in comparison to the comparative example shown in FIG. 7, the radiant heat, which is incident in an oblique direction that is oblique to the rotational center axis O, can be easily conducted to the thermal fuse 35. Therefore, according to the present embodiment, the incident angle of the radiant heat, which can quickly approach the thermal fuse 35, can be increased.

Particularly, in the present embodiment, each of the outer edge parts 40a, 41a of the recesses 40, 41 is located on the side of the corresponding imaginary line L1, L2, which is opposite from the end surface 13b (i.e., the side that is opposite from the friction surface 13a). Each of the slit forming parts 13c1, 13d1 is a surface part that borders on the corresponding space, which forms the corresponding magnetic shield slit 13c, 13d. The slit forming part 13c1, 13d1 receives the radiant heat, which is conducted from the friction surface 13a of the rotor 10 through the space that forms the corresponding magnetic shield slit 13c, 13d. Therefore, the slit forming part 13c1, 13d1 is a portion of the rotor 10, in which the temperature is high. In this way, the conduction path of the radiant heat from the closest part of the high temperature portion of the rotor 10, which is closest to the thermal fuse 35, to the thermal fuse 35 is provided.

Thus, according to the present embodiment, in comparison to the comparative example of FIG. 7, a required time period, which is required to increase the temperature at an inside portion of the thermal fuse 35 to a predetermined temperature, can be shortened, and thereby the response of the thermal fuse 35 can be improved.

Cases of typical thermal fuses have a metallic color or a white color, so that the typical thermal fuses have the high reflectivity for reflecting the radiant heat. Therefore, the high absorbability for absorbing the radiant heat cannot be achieved by simply exposing the thermal fuse from the resin member 37. Thus, the response of the thermal fuse cannot be largely improved by simply exposing the thermal fuse from the resin member 37.

In contrast, according to the present embodiment, the surface of the thermal fuse 35 is covered with the thin film portion 37a except the exposed portion 35a. Furthermore, the exposed portion 35a of the thermal fuse 35, which is exposed from the thin film portion 37a, is covered with the coating film 35c, which has the black color. In other words, the exposed portion 35a of the case 351 is covered with the coating film 35c that has the black color, which has the higher value of absorption spectrum (the high absorbance) for the wavelength range (0.1 μm to 0.1 mm) of the radiant heat in comparison to the case 351. When the surface of the thermal fuse 35 is covered with the resin or the coating film, which has the higher value of absorption spectrum in comparison to the case 351 of the thermal fuse 35, the absorbability for absorbing the radiant heat is improved.

In this way, according to the present embodiment, the response of the thermal fuse 35 can be improved in comparison to the case where the thermal fuse 35 is exposed from the resin member 37 without forming the thin film portion 37a, and the exposed portion of the case 351 of the thermal fuse 35 has the metallic color or the white color.

Furthermore, since the resin member 37 has the black color, the resin member 37 has the high absorbability for the radiant heat. However, the resin member 37 does not absorb all of the radiant heat, and a portion of the radiant heat is reflected from the surface of the resin member 37. In view of this point, according to the present embodiment, each of the outer edge parts 40a, 41a of the recesses 40, 41 of the resin member 37 is tapered such that the radiant heat, which is reflected from the outer edge part 40a, 41a is directed toward the thermal fuse 35. Even with this arrangement, the required time period, which is required to increase the temperature of the inside portion of the thermal fuse 35 to the predetermined temperature, can be reduced.

Second Embodiment

In the first embodiment, the thickness of the thin film portion 37a, which covers the thermal fuse 35, is equally set at the longitudinal center part and the end ports of the thermal fuse 35. In the second embodiment, the thickness of the thin film portion 37a is varied.

Figure 8:
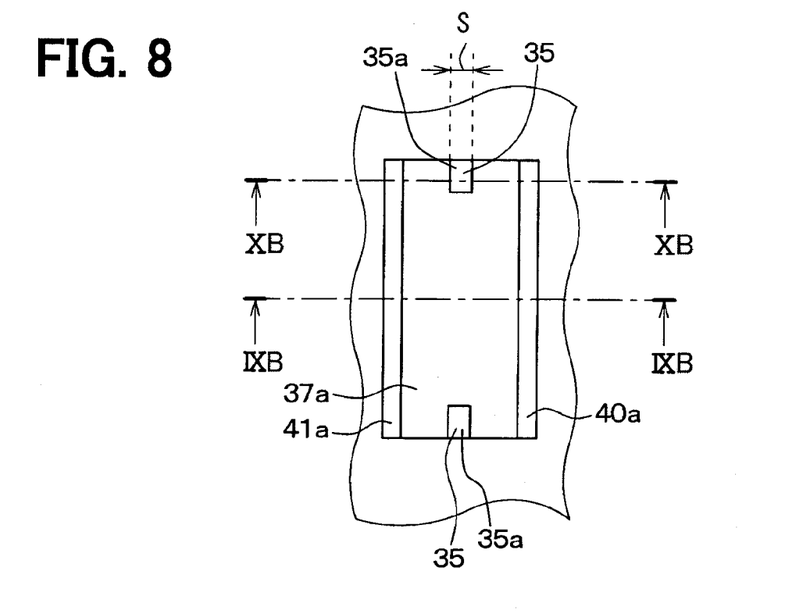
FIG. 8 is a front view of a portion of the resin member of a second embodiment of the present disclosure, which covers a thermal fuse.
Figure 9:
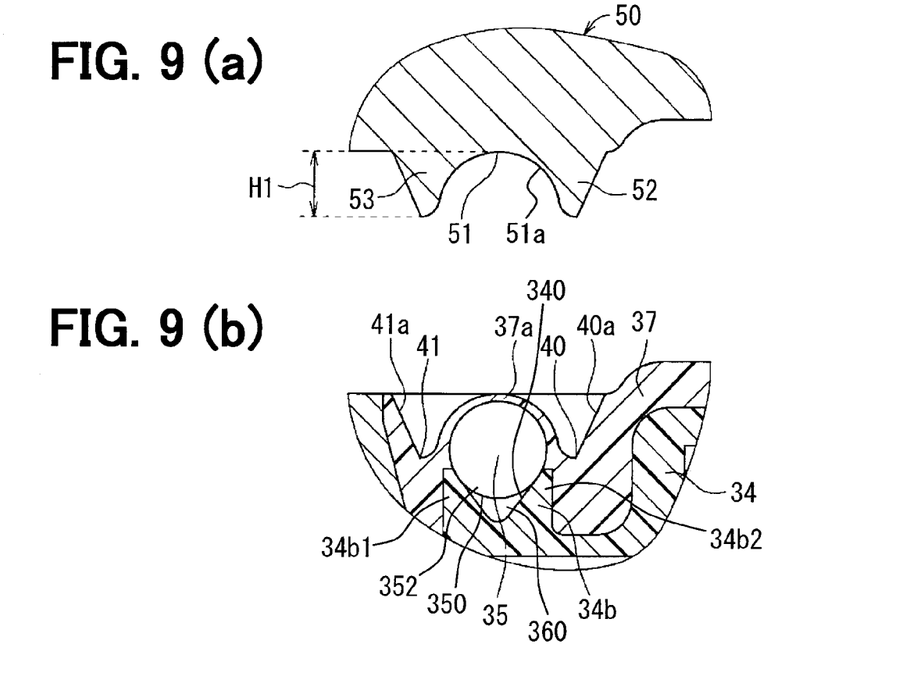
FIG. 9(a) is a cross-sectional view of a die used in resin molding of the resin member of the second embodiment.
FIG. 9(b) is a cross-sectional view taken along line IXB-IXB in FIG. 8.

As shown in FIGS. 8 and 9(b), at the longitudinal center part of the thermal fuse 35, the thin film portion 37a covers the entire surface range of the side of the outer peripheral surface 350 of the thermal fuse 35 located on the side where the end surface 13b is placed (i.e., the side where the armature 20 is placed). The thickness of the thin film portion 37a is generally constant throughout the entire range of the longitudinal center part of the thermal fuse 35.

Figure 10:
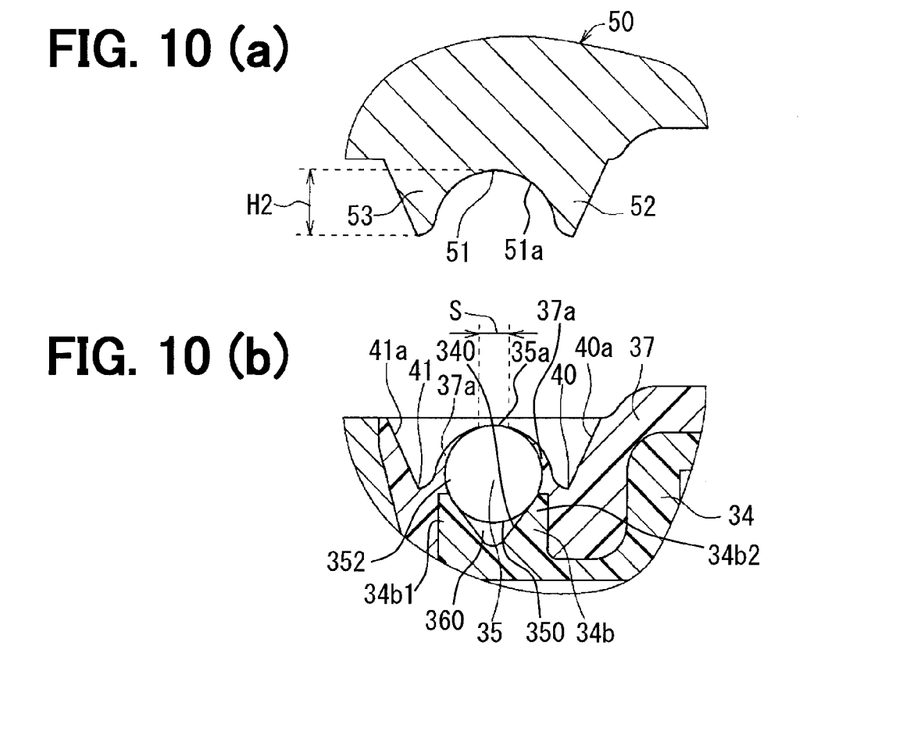
FIG. 10(a) is a cross-sectional view of a die used in resin molding of the resin member of the second embodiment.
FIG. 10(b) is a cross-sectional view taken along line XB-XB in FIG. 8.

As shown in FIGS. 8 and 10(b), at the longitudinal end part of the thermal fuse 35, a portion of the thermal fuse 35 is covered with the thin film portion 37a in a manner similar to that of the first embodiment. Specifically, a portion of the outer peripheral surface 350 of the thermal fuse 35, which is located on the side where the armature 20 is placed, is covered with the thin film portion 37a except the exposed portion 35a of the thermal fuse 35. The thickness of the thin film portion 37a is progressively increased from the exposed portion 35a of the thermal fuse 35 in a direction away from the exposed portion 35a.

The above-described difference in the thickness of the thin film portion 37a is obtained by changing a height H1 of the press portion 51 of the die 50 from a height H2 of the press portion 51 of the die 50, as shown in FIGS. 9(a) and 10(a).

According to the present embodiment, at the longitudinal center part of the thermal fuse 35, the thermal fuse 35 is covered with the thin film portion 37a without exposing the thermal fuse 35. Therefore, in comparison to the case where the exposed portion 35a of the thermal fuse 35 is exposed from the resin member 37, the amount of absorption of the radiant heat, which is absorbed by the thin film portion 37a, can be increased at the longitudinal center part of the thermal fuse 35.

Third Embodiment

Figure 11:
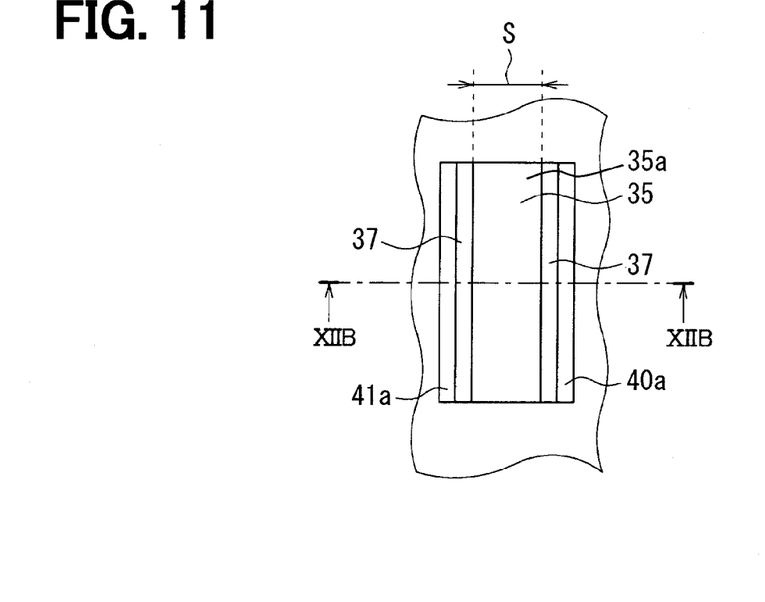
FIG. 11 is a front view of a portion of a resin member, which covers a thermal fuse, in a third embodiment.
Figure 12:
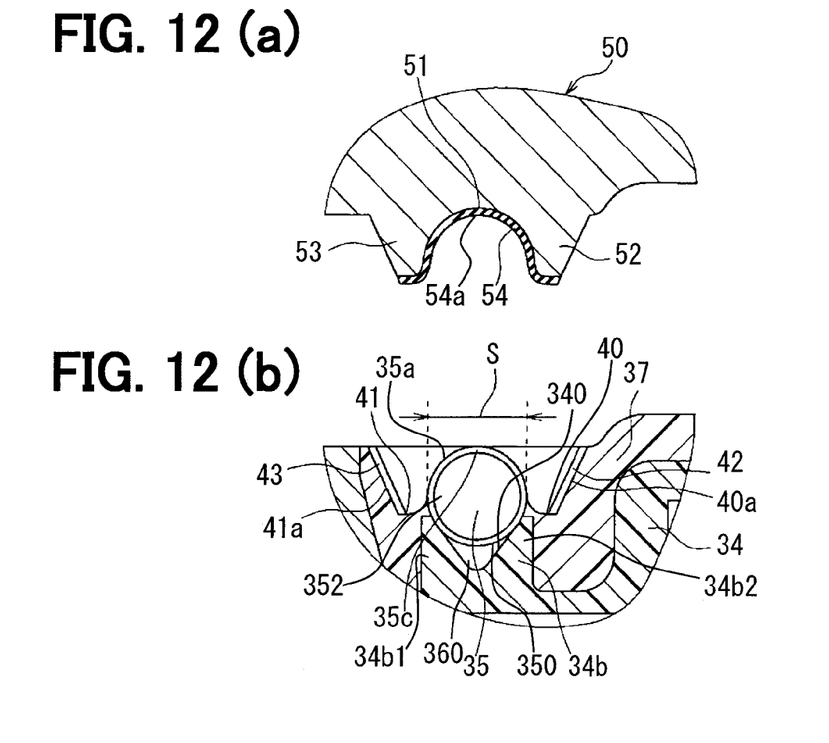
FIG. 12(a) is a cross-sectional view of a die used in resin molding of the resin member of the third embodiment.
FIG. 12(b) is a cross-sectional view taken along line XIIB-XIIB in FIG. 11.

In a third embodiment of the present disclosure, as shown in FIGS. 11 and 12(b), a size of the exposed portion 35a of the thermal fuse 35, which is exposed from the resin member 37, is increased in comparison to the first embodiment.

Specifically, as shown in FIG. 12(b), the thermal fuse 35 is exposed in the inside space of the recess 40 and the inside space of the recess 41, which are formed on the two opposite sides, respectively, of the thermal fuse 35. Thereby, at least one half of an entire circumferential range of the outer peripheral surface 350 (i.e., an angular range of at least 180 degrees of the outer peripheral surface 350 in the circumferential direction) of the thermal fuse 35, which is located on the side where the end surface 13b is placed (i.e., the side where the friction surface 13a is placed), is exposed from the resin member 37 to form the exposed portion 35a.

This is achieved by installing a resilient member 54, which is made of a resilient material (elastomer), to the press portion 51 of the die 50, as shown in FIG. 12(a). Specifically, at the time of resin molding, there is implemented a state, in which a gap is not present between the thermal fuse 35 and a recessed surface 54a of the resilient member 54 of the press portion 51. In this way, at least one half of the entire circumferential range of the outer peripheral surface 350 of the thermal fuse 35 is exposed from the resin member 37 to form the exposed portion 35a. The recessed surface 54a of the resilient member 54 is an arcuately curved surface and has a radius of curvature, which is slightly larger than a radius of curvature of the outer peripheral surface 350 of the thermal fuse 35, or has a radius of curvature, which is substantially equal to a radius of curvature of the outer peripheral surface 350 of the thermal fuse 35. In other words, the radius of curvature of the recessed surface 54a of the resilient member 54 is equal or larger than the radius of curvature of the outer peripheral surface 350 of the thermal fuse 35.

Even in the present embodiment, similar to the first embodiment, the coating film 35c of the black color is formed at least in the exposed portion 35a of the outer peripheral surface 350 of the thermal fuse 35, which is exposed from the resin member 37. Therefore, even in the present embodiment, the advantages, which are similar to those of the first embodiment, can be achieved.

Furthermore, in the present embodiment, a coating film 42, 43 of a white color is formed in the outer edge part 40a, 41a of each of the recesses 40, 41, which is configured into the tapered form. In this way, the amount of radiant heat, which is reflected from the outer edge part 40a, 41a toward the thermal fuse 35, can be increased.

The color of the coating film 42, 43 is not limited to the white color and can be any other suitable color that has a higher reflection property for reflecting the radiant heat in comparison to the resin member 37.

Furthermore, in the present embodiment, the color of the resin member 37 is the black color, which has the high absorption property for absorbing the radiant heat. Alternatively, the color of the resin member 37 may be changed to the white color that has the high reflection property for reflecting the radiant heat. In such a case, it is not required to form the coating film 42, 43.

Other Embodiments

The present disclosure is not limited to the above embodiments, and the above embodiments may be appropriately modified within the scope of the present disclosure.

(1) In each of the above embodiments, the recesses 40, 41 are formed in the surface of the resin member 37 at the two adjacent locations, which are respectively located on the two opposite sides of the thermal fuse 35. Alternatively, the recess may be formed at only one of the two sides of the thermal fuse 35. Even in such a case, since the conduction path, along which the radiant heat can be easily conducted, is provided at the location adjacent to the thermal fuse 35. Therefore, the response of the thermal fuse 35 can be improved in comparison to the comparative example of FIG. 7.

(2) In each of the above embodiments, the outer edge part 40a, 41a of each of the recesses 40, 41 is located on the side of the corresponding imaginary line L1, L2, which is opposite from the end surface 13b (i.e., the side that is opposite from the friction surface 13a). Alternatively, the outer edge part 40a, 41a of each of the recesses 40, 41 may be not located on the side of the corresponding imaginary line L1, L2, which is opposite from the end surface 13b. Even in such a case, in comparison to the comparative example of FIG. 7, the radiant heat, which is incident in the oblique direction that is oblique to the rotational center axis O, can be easily conducted to the thermal fuse 35. Thereby, the response of the thermal fuse 35 can be improved.

(3) In each of the above embodiments, the outer edge part 40a, 41a of each of the recesses 40, 41 is configured into the tapered form. Alternatively, the outer edge part 40a, 41a of each of the recesses 40, 41 may be configured into any other suitable shape. For example, each outer edge part 40a, 41a may be configured into a planar surface that is parallel to the rotational axis of the compressor 2.

(4) In the first and second embodiments, the thin film portion 37a of the resin member 37 and the coating film 35c have the black color. Alternatively, the thin film portion 37a of the resin member 37 and the coating film 35c may have any other suitable color as long as it has the larger value of absorption spectrum in the wavelength range of the radiant heat in comparison to the case 351 of the thermal fuse 35. This is also true for the coating film 35c.

(5) The above respective embodiments are not unrelated to each other. That is, in the above respective embodiments, the component(s) may be combined with the component(s) of any other embodiment(s) in an appropriate manner except a case where the combination is clearly impossible. Furthermore, in the above respective embodiments, it should be understood that the components are not necessarily indispensable except a case where the components are expressly stated as indispensable and a case where the components are regarded as indispensable in view of the principle.

(6) In the above respective embodiments, the coil spool 34, which includes the mount 34b, is made of the polyamide resin that is resiliently deformable. However, the coil spool 34, which includes the mount 34b, may be made of any other suitable material as long as the material is resiliently deformable. Furthermore, in the above embodiments, the mount 34b is seamlessly and integrally formed with the coil spool 34 from the material that is the same as the material of the coil spool 34. Alternatively, the mount 34b, which is made of the resiliently deformable material, may be formed separately from the coil spool 34 and may be joined to the coil spool 34 later.

Figure 13:
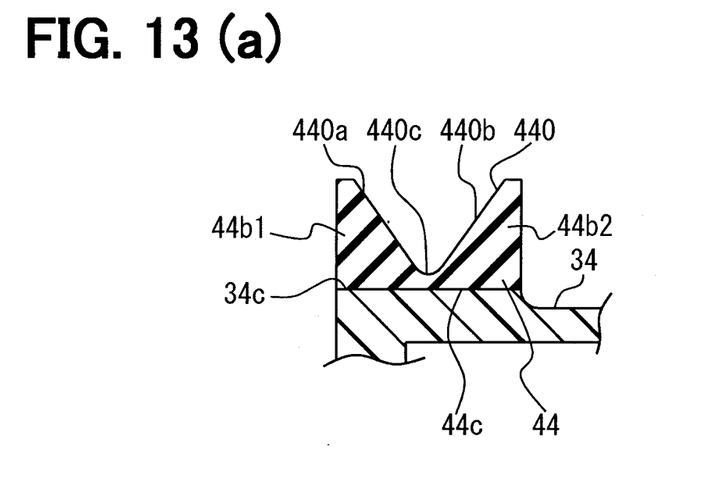
FIG. 13(a) is a partial cross-sectional view showing a first modification of the mount of the present disclosure.
FIG. 13(b) is a partial cross sectional view showing a second modification of a mount of the present disclosure.
FIG. 13(c) is a partial cross-sectional view showing a third modification of the mount of the present disclosure.

(7) In place of the mount 34b made of the polyamide resin in the above respective embodiments, a mount, which is made of a resilient material (elastomer) having a lower elastic modulus in comparison to the polyamide resin, may be interposed between the coil spool 34 and the thermal fuse 35. FIGS. 13(a) to 13(c) are cross sectional views, which correspond to the partial cross-sectional view of the mount 34b of FIG. 6(c) and show first to third modifications of the mount 34b of the above respective embodiments.

In the first modification of FIG. 13(a), in place of the mount 34b, a mount (support portion) 44, which is made of the resilient material (elastomer), is used. A connection surface 44c of the mount 44 is joined to a connection surface 34c of the coil spool 34 with a bonding agent or the like. The connection between the mount 44 and the coil spool 34 is not limited to the joint made with the bonding agent or the like. For example, the mount 44 may be press fitted into a recess formed in the coil spool 34. Furthermore, similar to the above respective embodiments, the mount 44 includes a first support arm 44b1, which has a first support surface 440a, and a second support arm 44b2, which has a second support surface 440b. A receiving groove 440 is formed between the first support arm 44b1 and the second support arm 44b2. The thermal fuse 35 is supported by the first support surface 440a of the first support arm 44b1 and the second support surface 440b of the second support arm 44b2. In a state where the thermal fuse 35 is received in the receiving groove 440, a space, which is similar to the space 360 shown in FIG. 6(b), is formed between the thermal fuse 35 and the bottom portion 440c of the receiving groove 440. At the time of pressing the thermal fuse 35 with the recessed surface 51a, 54a of the press portion 51 of the die 50 discussed in the above respective embodiments, the first support arm 44b1 and the second support arm 44b2 are resiliently deformed, so that the first support arm 44b1 and the second support arm 44b2 are flexed toward the left side and the right side in FIG. 13(a) and also resiliently deformed downward in FIG. 13(a) to absorb the pressure applied from the die 50. Therefore, it is possible to effectively limit squashing of the thermal fuse 35 by the die 50.

Furthermore, in the second modification shown in FIG. 13(b), a mount (a support portion) 64, which is made of the resilient material (elastomer), is used in place of the mount 44 of FIG. 13(a). A connection surface 64a of the mount 64 is joined to the connection surface 34c of the coil spool 34 with the bonding agent or the like. The inner surface 640a of the receiving groove 640 of the mount 64, which receives the thermal fuse 35, is an arcuately curved surface that has a radius of curvature, which is slightly larger than the radius of curvature of the outer peripheral surface 350 of the thermal fuse 35. The configuration of the inner surface 640a into the curved surface provides the following advantage. That is, when the thermal fuse 35 is pressed with the recessed surface 51a, 54a of the press portion 51 of the die 50, the contact surface area between the outer peripheral surface 350 of the thermal fuse 35 and the inner surface 640a of the mount 64 is increased in comparison to the case of the mount 34b of the above respective embodiments, and thereby the pressure, which is applied from the die 50 to the thermal fuse 35, can be effectively spread and absorbed along the inner surface 640a of the mount 64. Therefore, it is possible to effectively limit squashing of the thermal fuse 35 by the die 50. Furthermore, the receiving groove 640 is also used to position the thermal fuse 35.

Furthermore, in the third modification shown in FIG. 13(c), a mount (a support portion) 74, which is made of the resilient material (elastomer), is used in place of the mount 44 of FIG. 13(a). A connection surface 74a of the mount 74 is joined to the connection surface 34c of the coil spool 34 with the bonding agent or the like. A mount surface 74b of the mount 74, on which the thermal fuse 35 is mounted, is a planar surface. Even in the case of the mount 74, which does not have the receiving groove, the pressure, which is applied from the die 50 to the thermal fuse 35, can be effectively absorbed through the resilient deformation of the mount 74 made of the resilient material (elastomer).

What is claimed is:

1. An electromagnetic clutch comprising:
   an electromagnetic coil that generates an electromagnetic attractive force when the electromagnetic coil is energized;
   a rotor that is rotated about a rotational center axis when the rotor receives a rotational drive force from a drive source, wherein the rotor includes a first surface and a second surface, which are spaced away from each other in an axial direction of the rotational center axis, and the first surface and the second surface extend in a direction perpendicular to the axial direction;
   an armature that is connectable with a rotatable shaft of a driven-side device, wherein the armature is attracted and attached to the first surface of the rotor by the electromagnetic attractive force when the electromagnetic coil is energized, and the armature is detached from the first surface of the rotor when the electromagnetic coil is not energized;
   a stator that is opposed to the second surface of the rotor in the axial direction and forms a space between the stator and the second surface, wherein the stator has an opening on a side wherein the second surface is located, and the stator receives the electromagnetic coil in an inside space of the stator, which is communicated with the opening;
   a resin member that closes the opening of the stator and seals the electromagnetic coil in the inside space of the stator; and
   a thermal fuse that is held by a portion of the resin member located in the opening of the stator and is melted and disconnected to cut supply of an electric current to the electromagnetic coil when a temperature of the thermal fuse is equal to or higher than a predetermined temperature; and
   the resin member has a recess that is formed in a predetermined position of a surface of the resin member, which is adjacent to the thermal fuse and is located on the side where the second surface is placed.

2. The electromagnetic clutch according to claim 1, wherein the recess is formed in the surface of the resin member on each of one side and another side of the thermal fuse.

3. The electromagnetic clutch according to claim 1, wherein:
   the rotor has a slit, which extends through the rotor between the first surface and the second surface; and
   with respect to an imaginary line, which connects between the slit and a center of a cross section of the thermal fuse by a shortest distance in an imaginary plane that is perpendicular to an axial direction of the thermal fuse, an outer edge portion of the recess is placed on a side of the imaginary line, which is opposite from the second surface.

4. The electromagnetic clutch according to claim 1, wherein the thermal fuse is covered by a thin film portion of the resin member, which is placed between the recess and the thermal fuse.

5. The electromagnetic clutch according to claim 4, wherein:
the thermal fuse includes a fusible material, which is melted and disconnected by heat, and a case, which receives the fusible material;
the case has an exposed portion, which is exposed from the thin film portion; and
the exposed portion of the case is covered with a coating film, and a value of absorbance of the coating film is higher than a value of absorbance of the case in a wavelength range of a radiant heat.

6. The electromagnetic clutch according to claim 1, wherein at least one half of a circumferential extent of an outer peripheral surface of the thermal fuse is exposed from the resin member and forms an exposed portion of the thermal fuse.

7. The electromagnetic clutch according to claim 6, wherein:
the thermal fuse includes a fusible material, which is melted and disconnected by heat, and a case, which receives the fusible material;
the case has an exposed portion, which is exposed from the resin member; and
the exposed portion of the case is covered with a coating film, and a value of absorbance of the coating film is higher than a value of absorbance of the case in a wavelength range of a radiant heat.

8. The electromagnetic clutch according to claim 1, wherein the recess is recessed at least to a depth that corresponds to a location of a center of a cross section of the thermal fuse in an imaginary plane that is perpendicular to an axial direction of the thermal fuse.

9. The electromagnetic clutch according to claim 1, comprising a support portion that is placed on a side of the thermal fuse, which is opposite from the second surface, wherein:
the support portion includes a first support arm and a second support arm, which project toward the thermal fuse;
the first support arm and the second support arm are resiliently deformable away from each other;
a portion of an outer peripheral surface of the thermal fuse is received in a receiving groove formed between the first support arm and the second support arm;
a cross-sectional area of the receiving groove is tapered in a direction away from the thermal fuse; and
a space is formed between a bottom portion of the receiving groove and the outer peripheral surface of the thermal fuse.

10. The electromagnetic clutch according to claim 9, wherein at least one half of a circumferential extent of the outer peripheral surface of the thermal fuse is exposed from the receiving groove.

11. The electromagnetic clutch according to claim 1, further comprising a support portion that is placed on a side of the thermal fuse, which is opposite from the second surface, wherein the support portion is made of elastomer and supports a portion of an outer peripheral surface of the thermal fuse.

12. A manufacturing method for the electromagnetic clutch of claim 1, comprising:
placing the electromagnetic coil and the thermal fuse configured into a cylindrical form in the inside space of the stator;
placing a die over the thermal fuse and contacting a recessed surface of the die to an outer peripheral surface of the thermal fuse, wherein the recessed surface is recessed from a projection of the die to form an arcuately curved surface that has a radius of curvature, which is equal to or larger than a radius of curvature of the outer peripheral surface of the thermal fuse; and
filling a resin material in a molten state into the inside space of the stator to mold the resin member having the recess formed by the projection of the die.

13. The manufacturing method according to claim 12, wherein the contacting of the recessed surface of the die to the outer peripheral surface of the thermal fuse includes contacting the recessed surface of the die, which has the radius of curvature larger than the radius of curvature of the outer peripheral surface of the thermal fuse, to the outer peripheral surface of the thermal fuse.

* * * * *